United States Patent [19]
Koichi et al.

[11] Patent Number: 5,190,774
[45] Date of Patent: Mar. 2, 1993

[54] APPARATUS FOR CALENDERING CORDS WITH ELASTOMERIC MATERIAL

[75] Inventors: Sanada Koichi, Kodaira, Japan; Takashi Matsumura, Wilson, N.C.

[73] Assignee: Bridgestone/Firestone Inc., Akron, Ohio

[21] Appl. No.: 896,787

[22] Filed: Jun. 9, 1992

Related U.S. Application Data

[63] Continuation of Ser. No. 648,941, Feb. 1, 1991, abandoned.

[51] Int. Cl.⁵ .................... B29C 31/00; B29C 67/00
[52] U.S. Cl. ........................... 425/363; 57/358; 57/902; 156/180; 156/397; 156/437; 264/175
[58] Field of Search ............. 57/352, 357, 358, 902; 156/178, 180, 390, 391, 397, 437, 441; 264/103, 175; 425/363, 365, 367

[56] References Cited

U.S. PATENT DOCUMENTS

| | | | |
|---|---|---|---|
| 2,456,923 | 12/1948 | Cogovan et al. | 156/178 |
| 2,512,762 | 6/1950 | Benson et al. | 156/437 |
| 2,522,722 | 9/1950 | Mitchell | 156/441 |
| 2,792,324 | 5/1957 | Daley et al. | 156/441 |
| 2,882,675 | 4/1959 | Tingas | 57/352 |
| 2,897,841 | 8/1959 | Hui et al. | 156/178 |
| 3,142,604 | 7/1964 | Mills et al. | 156/178 |
| 3,255,875 | 6/1966 | Tierney | 156/178 |
| 3,668,851 | 6/1972 | Heinzmann et al. | 57/352 |
| 3,781,953 | 1/1974 | Stegelman | 264/103 |
| 4,289,558 | 9/1981 | Eichenbaum et al. | 156/441 |
| 4,318,762 | 3/1982 | Meyer | 156/441 |
| 4,822,444 | 4/1989 | Weingart et al. | 156/441 |
| 4,877,471 | 10/1989 | McCowin et al. | 156/441 |

*Primary Examiner*—Jay W. Woo
*Assistant Examiner*—Scott Bushey
*Attorney, Agent, or Firm*—Sughrue, Mion, Zinn, Macpeak & Seas

[57] ABSTRACT

An apparatus for calendering cords with elastomeric material which has a main guide board and guide rolls located at the entrance side of the main guide board, with the guide rolls being located along columns of holes in the main guide board and being freely rotatably supported, the guide rolls making the inclined angles of cords, relative to the centerline of the holes, smaller near the holes in order to reduce the friction between the cords and the holes so as to consequently reduce the problem of curling of the coated cords.

8 Claims, 3 Drawing Sheets

APPARATUS FOR CALENDERING CORDS WITH ELASTOMERIC MATERIAL

This is a Continuation of Application No. 07/648,941 filed Feb. 1, 1991 now abandoned.

BACKGROUND OF THE INVENTION

The present invention relates to an apparatus for calendering cords such as tire steel cords with elastomeric or rubber-like materials without causing any curling of the coated cords.

In a calendering process in a tire manufacturing plant, tire steel cords are pulled out from spools in a creel stand, pass through a main guide board having holes for a first step arrangement of cords, and are then pinched by a comb-roll for a second arrangement. Then they are coated with rubber-like material by a set of calender rolls. When a creel stand having a narrow width is located in front of a main guide board, the quality of the coated cords is good. The coated cords have no tendency to curl.

If the creel stand is located at a diagonal position against the main guide board, however, the cords chafe the corners of the holes or nozzles in the main guide board even if the corners are rounded. As a result of that chafing, the coated cords tend to curl. The important points are the angles between the projection of the cords to a horizontal plane and the center line of the guide board on the same plane. The vertical distance between a hole of the main guide board and the corresponding spool of the creel stand is not so critical because most creel stands are designed with a low height. This noted angulation causes the difficulty in handling the coated cords. The same problem may occur with a wide creel stand because the angles (details of which discussed herein) the cords emanating from the spools at the side portion of the creel stand are large.

SUMMARY OF THE INVENTION

The present invention is directed to a solution of the above mentioned curling tendency of the coated cords if the creel stand is located at a diagonal position against the main guide board or if the creel stand width is wide.

An object of the present invention is to provide an apparatus for calendering cords with elastomeric material having guide rolls located to the side of the main guide board, which solves the problem on the curling tendency of the coated cords.

According to one aspect of the present invention there is provided an apparatus for calendering cords with elastomeric material comprising at least one creel stand having spools of cords; a main guide board having holes for the cords to go through which are arranged in two dimensional directions on said guide board, one of the directions being an approximately horizontal direction and the other direction being an approximately vertical direction; freely rotatable guide rolls located at an entrance side of the main guide board, the guide rolls extending along each array of holes in the approximately vertical direction; a guide tool for the cords for arranging them to be calendered; and a set of calender rolls for coating the cords with elastomeric material.

According to the present invention as noted above, the guide rolls decrease the angle between the projection of the cords to a horizontal plane and center line of the guide board on the same plane to minimize the problem of curling caused by chafing between cords and holes of the main guide board. This improvement occurs even if the creel stand is located at a diagonal position with respect to the main guide board or the creel stand width is wide.

DETAILED DESCRIPTION OF THE PREFERRED EMBODIMENT

In the following description, reference will be made to one preferred embodiment of the present invention as illustrated in FIGS. 1 through 5.

Figure 1:
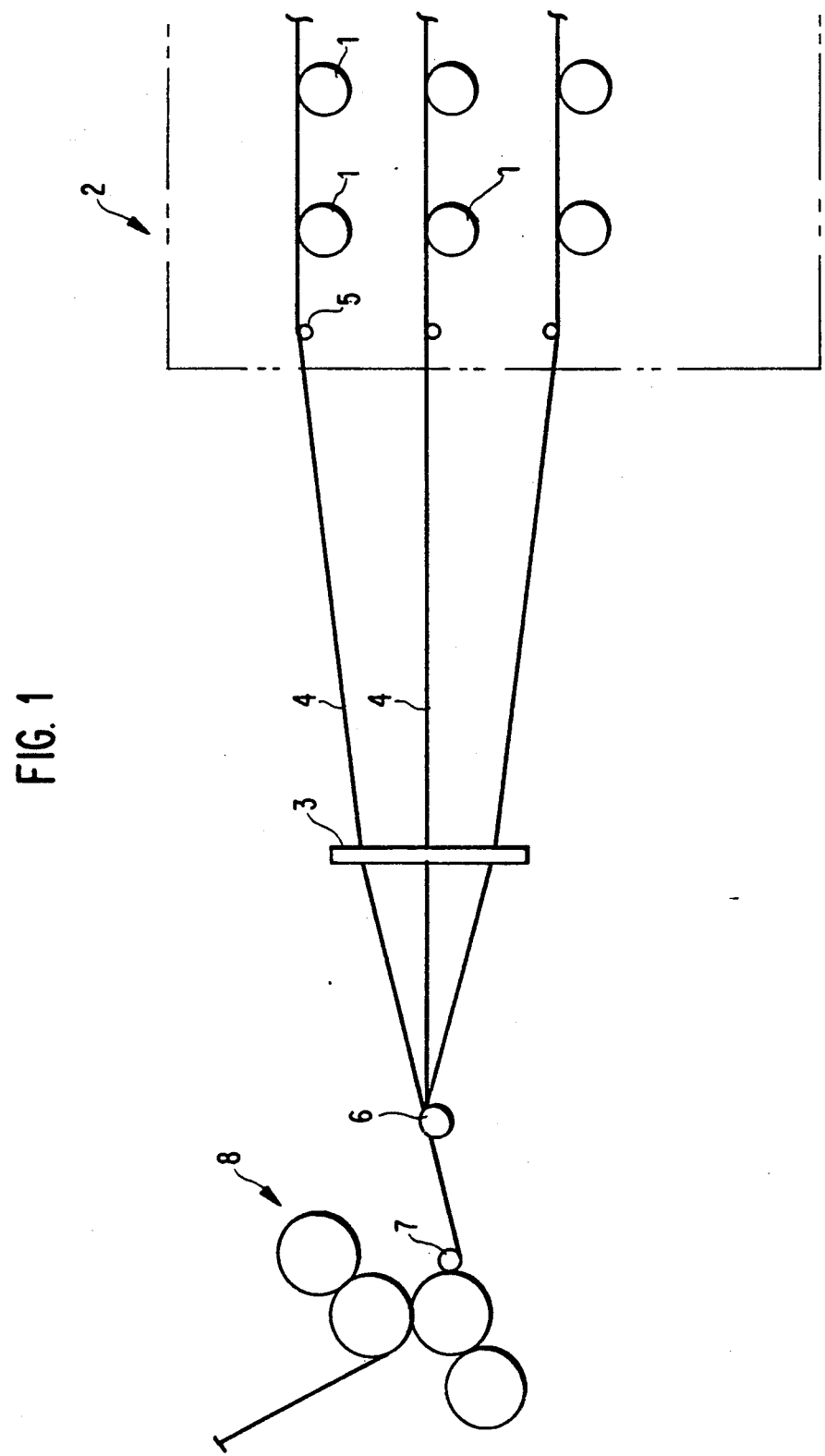
FIG. 1 is a general schematic side view of a calender according to one preferred embodiment of the present invention.

FIG. 1 is a schematic side view of a calender used in the production of cord-reinforced elastomeric material for use, for example, in pneumatic tires. It will be understood and appreciated that cord reinforced materials can be used for other applications such as belts. Spools of uncoated cords 1 are supported in a creel stand 2 which is located in front of a main guide board 3. The main guide board 3 is a flat board having a plurality of holes therein. Separate liners or nozzles (see FIG. 2) are inserted in the holes of the guide board as will be described later. The holes are arranged as a grid in two dimensions. One is the horizontal direction and the other is approximately in the vertical direction. Other arrays can be used so long as the pattern is regular.

Figure 2:
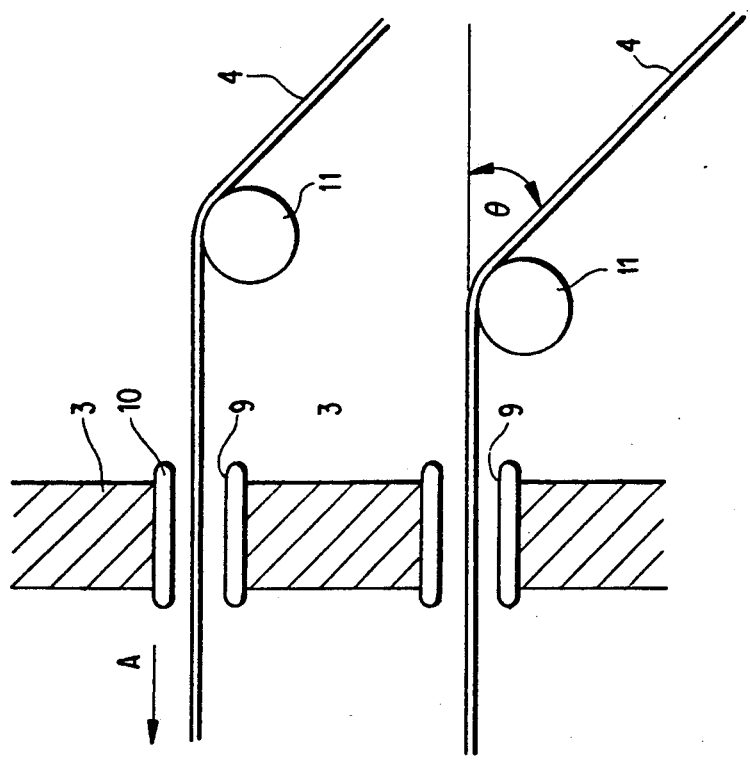
FIG. 2 is a schematic partial cross section of the main guide board and guide rolls in a horizontal plane according to the preferred embodiment of the present invention.

Comb-roll 6 has a plurality of thin flanges in parallel one another in order to laterally arrange cords to predetermined spaced position for calendering. Cords 4 are pulled from spools 1 through rolls 5, main guide board 3, comb-roll 6 and a roll 7 to a set of calender rolls 8. The cords may be steel or another composition. Cords 4 are initially or roughly arranged at the main guide board 3 and then finally and precisely arranged at comb-roll 6. Cords 4 are coated at calender rolls 8 with an elastomeric material. FIG. 2 is a schematic partial cross section of the main guide board in a horizontal flat plane.

Nozzles 9 are inserted into the holes of the main guide board 3 and are preferably made of ceramic, super strong metal or other like materials. The nozzles should not erode as the cord passes through them and in contact with surfaces thereof. Numeral 10 defines the rounded leading edge portion of nozzle 9, with $\Theta$ defining the angle between the projection of the cords 4 to a horizontal flat plane from the center line of the nozzle 9. An arrow A illustrates the direction of movement of cord 4. FIG. 2 shows the spacing between cord 4 and nozzle 9, especially at rounded leading edge portion 10 to prevent chafing.

Figure 5:
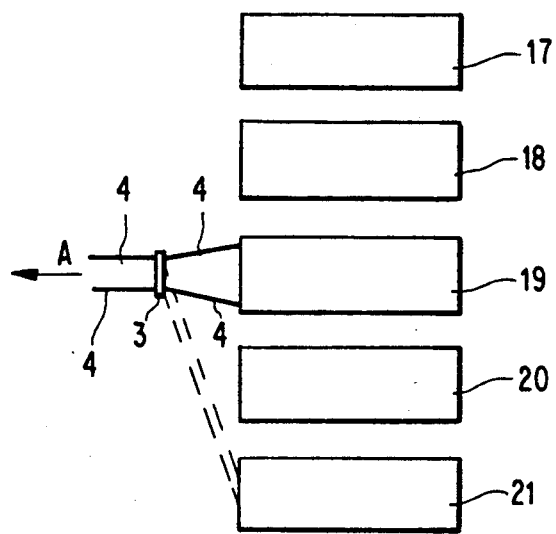
FIG. 5 is a schematic plan view of creel stand according to the preferred embodiment of the present invention.

Friction and the bending of steel cords 4 due to chafing cause the problem of curling. When the cord angle Θ is larger than a predetermined value, for example 30 degrees, depending on the type of compositions and thickness etc., of cords 4, chafing at the edge portion 10 of nozzle 9 causes the problem of curling even if the guide portion 10 is rounded. The angle from the vertical normally does not need to be considered relative to angle Θ since, generally speaking, creel stand 2 is low in height and positioned at a location for enough forward to avoid any problem in angulator orientation of the cords. In FIGS. 1 and 5 separate guide rolls, mentioned later, are omitted in order to simplify the explanation of this embodiment.

Figure 3:
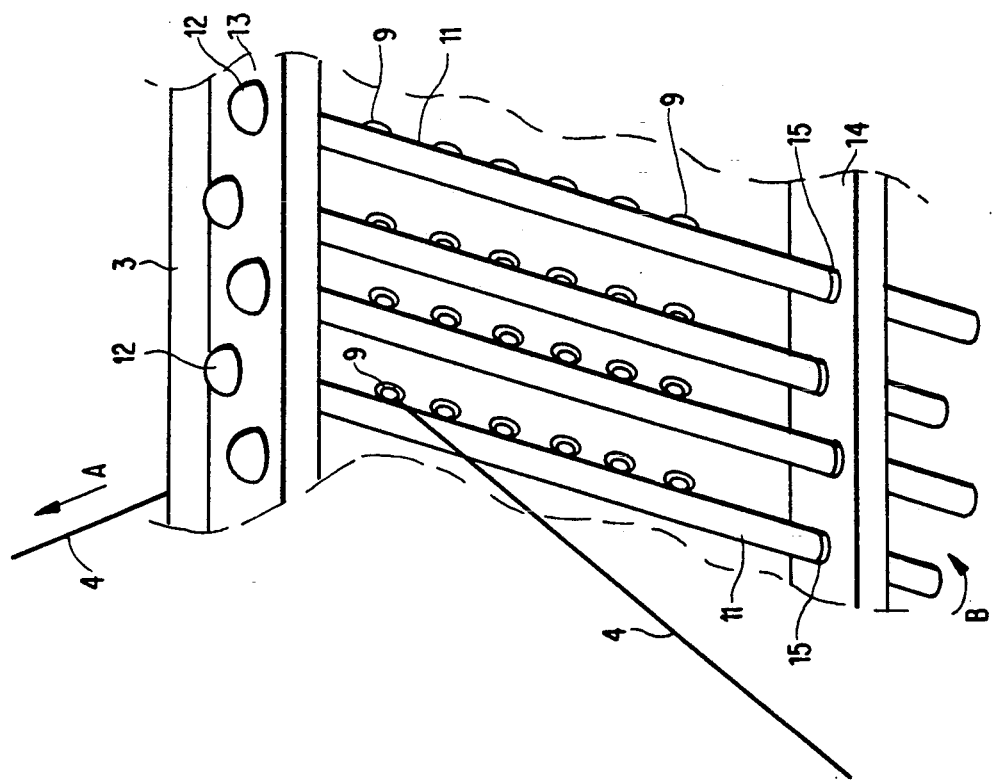
FIG. 3 is a schematic partial view of the main guide board and guide rolls according to the preferred embodiment of the present invention.

FIG. 3 is a schematic partial view of the main guide board 3 and guide rolls 11. Guide rolls 11, which are made of hardened steel for improvement of wear resistance, have half or semi spherical heads 12 on their upper ends. Arrow B shows the direction of rotation of guide rolls 11. An upper frame 13 and a lower frame 14, which are fixed to the main guide board 3, freely rotatably support guide rolls 11 via lubrication free bearings 15. Guide rolls 11 arranged parallel to each other and to main guide board 3 are arranged in a zig-zag pattern to save space because the distances between adjacent rows of nozzles 9 are relatively narrow. As illustrated in FIG. 3, guide rolls 11 are slightly vertically inclined to match the inclination of the vertical lines of the columns of nozzles 9. Guide rolls 11 are parallel to the columns of nozzles 9 and the direction of movement of the steel cords 4 changes as they pass around the guide roll 11. Guide rolls 11 are rotated by cords 4 and cords 4 pass through nozzles 9.

Figure 4:
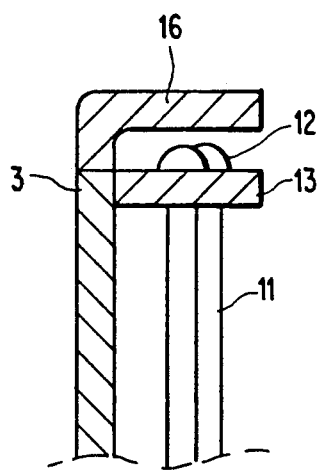
FIG. 4 is a schematic partial cross sectional side view of the main guide board and guide rolls according to the preferred embodiment of the present invention.

FIG. 4 is a schematic partial cross sectional side view of the main guide board 3 and guide rolls 11. A cover 16 is removably attached to main guide board 3 by means of bolts (not shown in FIG. 4) in order to permit the changing of guide rolls 11. Cover 16 prevents guide rolls 11 from exiting from lower frame 14.

FIG. 5 is a schematic plan view of a plurality of creel stands. In this case, five creel stands 17–21 are located in parallel near the main guide board 3. If cords 4 emanating from spools 1 in creel stand 19, located in front of the main guide board 3, are calendered, the cords angles are not large. However, if cords from spools in creel stand 17 or creel stand 21, both of which are at diagonal or offset positions in relation to main guide board 3, are calendered, the cord angles are unacceptably large.

Referring again to FIG. 2 a schematic partial cross section of main guide board 3 and guide rolls 11 in a horizontal flat plane is shown. As illustrated in FIG. 2, even if cords angles are large, freely rotatable guide rolls 11 reduce the friction between cords 4 and nozzles 9. The friction between cords 4 and the guide rolls 11 is small because the guide rolls 11 are freely rotatably supported.

It should be noted that in FIG. 5 five different types of reinforcing cords, such as steel cords for example, are readily available for calendering, which is most desirable from the viewpoint of productivity because modern tire manufacturing technology requires frequent changes of types, sizes and constructions of such reinforcing of cords.

The operation of the apparatus for calendering cords with elastomeric material of this embodiment will now be described. Referring to FIGS. 1 and 5, it may be desired that cords 4, on spools 1 in creel stand 21, are to be coated with elastomeric material. Initially, for example, steel cords 4, of a 1×5×0.25 construction are fed from the spools 1 in creel stand 21 to calender roll set 8 through the rolls 5, guide rolls 11 (FIG. 2) and properly sized nozzles 9, respectively, for the purpose of the initial arrangement and then through the flanges of a comb-roll 6 for precise arrangement. Thereafter, steel cords 4 are pulled and coated with elastomeric material by calender roll set 8. In this instance of creel stand 21, cord angles Θ are large.

As shown in FIG. 2, however, the cord angles Θ between nozzles 9 and guide rolls 11 are very small. The tensions in cords 4 is strong. Guide rolls 11 are rotated by the movement of cords 4 and are able to move vertically up and down. Bearings 15 are very convenient from the maintenance stand point because they do not need lubrication. Guide rolls 11 never move out of frame 14 since cover 16 restricts their movement. While creel stand 21 is in use the spools of other creel stands, for example the spools in creel stands 17 can be changed for future use. After the usage of creel stand 21 is completed, cords from other spools on other creel stands can be led to calender roll set 8 via rolls 5, guide rolls 11 and properly sized nozzles 9, respectively, and the flanges of comb-roll 6 to be coated with elastomeric material. As described above, the quality of the coated steel cords calendered by the apparatus of this invention is excellent.

While the invention has been particularly shown and described with reference to preferred embodiments thereof, it will be understood by those skilled in the art that the foregoing and other changes in form and details can be made therein without departing from the spirit and scope of the invention.

We claim:

1. An apparatus for calendering cords with elastomeric material comprising:
    at least two creel stands having means for holding multiple spools of cords;
    a main guide board having an array of holes for said cords to pass through, said holes arranged in two dimensions on said guide board;
    freely rotatable guide rolls located at an entrance side of said main guide in such a manner that center lines of said holes are consonant with a tangent line of said guide rolls, said guide rolls extending along columns of said array of holes in approximately a vertical direction and decreasing cord angles to said holes so that chafing between said cords and holes is reduced, said guide rolls having head portions and further comprising an upper frame located at the upper portion of said main guide board and having a plurality of holes for supporting said guide rolls in cooperation with said guide roll head portions; a lower frame having a plurality of holes through which said guide rolls extend; and a cover located above said head portions and spaced to prevent said guide rolls from exiting from the holes in said lower frame;
    a guide tool for arranging said cords to be calendered;
    a set of calender rolls for coating said cords with elastomeric material; and
    at least one of said creel stands being located at an offset position relative to said guide board.

2. An apparatus as claimed in claim 1, wherein one of said two dimensions being an approximately horizontal direction and the other of said two being an approximately vertical direction.

3. Apparatus as claimed in claim 1, wherein one of said guide rolls located between every two adjacent columns of said array of holes in said approximately vertical direction in a zigzag manner in a horizontal plane.

4. Apparatus as claimed in claim 1, further comprising liners inserted in said holes.

5. Apparatus as claimed in claim 4, wherein said liners are made from a material harder than said cords to prevent erosion of said liners.

6. Apparatus as claimed in claim 1, said guide rolls made of hardened steel.

7. Apparatus as claimed in claim 6, said guide rolls supported via lubrication free bearings.

8. Apparatus as claimed in claim 1, wherein each of said guide rolls are positioned with respect to columns of holes in a manner that tangent lines passing through holes in a column from a circumferential edge of a guide roll is substantially aligned with mid-points of each hole.

* * * * *